United States Patent
Lyons et al.

(10) Patent No.: US 9,249,297 B2
(45) Date of Patent: *Feb. 2, 2016

(54) FUNCTIONAL MBS IMPACT MODIFIERS FOR USE IN ENGINEERING RESINS

(71) Applicant: Arkema Inc., King of Prussia, PA (US)

(72) Inventors: Jason M. Lyons, King of Prussia, PA (US); Navneeth K. Singh, Pearland, TX (US); Xianfeng Shen, Vienna, VA (US)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/468,389

(22) Filed: Aug. 26, 2014

(65) Prior Publication Data

US 2014/0364541 A1    Dec. 11, 2014

(51) Int. Cl.
| | |
|---|---|
| *C08L 69/00* | (2006.01) |
| *C08L 67/00* | (2006.01) |
| *C08L 33/14* | (2006.01) |
| *C08L 9/00* | (2006.01) |
| *C08L 67/02* | (2006.01) |
| *C08L 51/04* | (2006.01) |

(52) U.S. Cl.
CPC . *C08L 69/00* (2013.01); *C08L 9/00* (2013.01); *C08L 33/14* (2013.01); *C08L 67/02* (2013.01); *C08L 51/04* (2013.01); *C08L 2207/53* (2013.01); *Y10S 977/742* (2013.01)

(58) Field of Classification Search
CPC ......... C08L 69/00; C08L 67/02; C08L 33/14; C08L 9/00
USPC ............................ 523/453; 524/445, 495, 523
See application file for complete search history.

(56) References Cited

U.S. PATENT DOCUMENTS

| | | |
|---|---|---|
| 5,186,993 A | 2/1993 | Hallden-Abberton et al. |
| 5,321,056 A | 6/1994 | Carson et al. |
| 5,409,967 A | 4/1995 | Carson et al. |
| 6,130,290 A | 10/2000 | Troy et al. |
| 6,689,827 B1 | 2/2004 | Schade et al. |
| 7,119,152 B1 | 10/2006 | Lacroix et al. |
| 7,195,820 B2 | 3/2007 | Hong et al. |
| 2006/0074148 A1 | 4/2006 | Ahn et al. |

FOREIGN PATENT DOCUMENTS

| | | |
|---|---|---|
| EP | 120712 * | 5/2002 |
| EP | 1 207 172 B1 | 12/2013 |
| JP | 54048850 | 4/1979 |

OTHER PUBLICATIONS

William T. W, Tseng and J-S Lee "Functional MBS Impact Modifers for PC/PBT Alloy" Journal of Applied Polymer Science, vol. 76 (2000) pp. 1280-1284.

* cited by examiner

*Primary Examiner* — James J Seidleck
*Assistant Examiner* — Deve E Valdez
(74) *Attorney, Agent, or Firm* — Lynn B. Morreale

(57) ABSTRACT

The invention relates to a methylmethacrylate-butadiene-styrene (MBS) core/shell polymer impact modifier containing functionalization in the shell. The functionalized MBS is useful as an impact modifier in engineering resins, and especially in blends of engineering resins, particularly where the blend contains both functional and non-functional resins. One specific engineering resin blend having excellent low temperature impact performance is a polycarbonate (PC)/polyethylene terephthalate (PET) blend with the functional MBS of the present invention.

14 Claims, No Drawings

FUNCTIONAL MBS IMPACT MODIFIERS FOR USE IN ENGINEERING RESINS

CROSS-REFERENCE TO RELATED APPLICATIONS

This application is continuation of U.S. patent application Ser. No. 12/936,607, filed on Oct. 6, 2010 which is a national stage application under 35 U.S.C. §371 of PCT/US09/34940, filed Feb. 24, 2009, which claims benefit of U.S. Provisional application 61/042,848, filed on Apr. 7, 2008.

FIELD OF THE INVENTION

The invention relates to a methylmethacrylate-butadiene-styrene (MBS) core/shell polymer impact modifier containing functionalization in the shell. The functionalized MBS is useful as an impact modifier in engineering resins, and especially in blends of engineering resins, particularly where the blend contains both functional and non-functional resins. One specific engineering resin blend having excellent low temperature impact performance is a polycarbonate (PC)/polyethylene terephthalate (PET) blend with the functional MBS of the present invention.

BACKGROUND OF THE INVENTION

Synthetic resins are widely used as engineering plastics in a variety of end-uses, such as building materials and automobile parts. The engineering resins have good physical and chemical resistance, and are low cost. A disadvantage of some engineering resins is that they have poor impact strength. Poor impact strength of these materials may be overcome by blending impact modifiers with the resins.

Impact modifiers generally consist of low-Tg, elastomeric polymers. Unfortunately the low-Tg polymer particles are typically difficult to handle. They are tacky and tend to stick together (blockiness), forming clumps or agglomerates during processing and storage. The agglomerates may be difficult to separate and disperse into the engineering polymer matrix, leading to a less than optimal modification of the plastic.

Core shell impact modifiers typically have rigid high $T_g$ polymers in their outmost shell at levels sufficient to cover the elastomeric components. Such impact modifiers have good anti-blocking properties and are easy to handle. They can also be spray-dried or coagulated.

Hydroxy alkyl (meth)acrylate monomers have been incorporated into the shell of a core-shell modifier to improve compatiblization of the shell with the matrix polymer. The use of hydroxy-functional monomers in the shell has been described in U.S. Pat. Nos. 5,321,056 and 5,409,967.

JP 54-48850 describes the use of polymers made from hydroxyl-functional monomers for use as impact modifiers.

U.S. Pat. No. 6,130,290 describes a core-shell particle having a two-part shell. The outer shell contains a hydroxy alkyl (meth)acrylate copolymer, while the inner shell does not.

U.S. Pat. No. 7,195,820 describes a core-shell polymer impact modifier with hydrophilic monomer units in the shell. The purpose of the hydrophilic shell monomers units was to resist migration of the shell polymer into the core—thus reducing the amount of polymer shell needed for complete coverage of the core. These core-shell impact modifiers were considered useful in many different polymer matrixes.

Polymer matrixes consisting of blends of functional polymers with non-functional materials present a unique challenge for impact modification. Conventional core-shell impact modifiers with non-functional shells tend to migrate toward the non-functional parts of the blend. This decreases the effectiveness of the impact modifier on the functional polymer.

In "Functional MBS Impact Modifiers for PC/PBT Alloy" by William T. W. Tseng, and J. S. Lee, Journal of Applied Polymer Science, Vol. 76, 1280-1282 (2000) the use of a functionalized MBS in a PC/PBT is explored. A PC/PET blend was not described. Applicants have found a much greater synergy for a functionalized MBS in a PC/PET alloy, than in a PC/PBT alloy.

Surprisingly it has been found that the impact modification properties of functional and non-functional resin alloys can be improved by using an impact modifier having a functionalized shell. One system showing an especially large impact improvement from the functional MBS impact modified is a polycarbonate/polyethylene terephthalate alloy.

While not being bound by any particular theory, it is believed that the functionalization in the particle shell associates with the functionalized polymer in the matrix, thus preventing migration of much of the core-shell impact modifier into the non-functionalized portions of the matrix, and providing localized dispersion. In a PET blend, the hydroxyl functionality on the PET reacts with the functional group on the functionalized MBS, anchoring much of the MBS in the brittle PET phase. Additionally, the use of a functionalized shell decreases the migration of shell monomer into the core during polymerization of the core-shell polymer, providing better shell coverage.

SUMMARY OF THE INVENTION

The invention relates to an impact modified polymer alloy composition comprising:
  a) a functional polymer
  b) and at least one non-functional polymer selected from the group consisting of alkyl (meth)acrylate polymers and copolymers, acrylonitrile/butadiene/styrene terpolymers (ABS), acrylonitrile/styrene/acrylate copolymers, polycarbonates, methacrylate/butadiene/styrene copolymers, polystyrene, acrylonitrile/acrylate copolymers, acrylonitrile/methyl methacrylate copolymers, polyolefins, polyvinyl chloride), a homopolymer of a vinylidene halide, and alloys thereof; and
  c) functional core-shell impact modifier, wherein the outermost shell comprises
from 0.5 to 30 weight percent, based on the shell polymer, of functional groups.

DETAILED DESCRIPTION OF THE INVENTION

By "core", as used herein, is meant the outermost elastomeric layer and all stages or layers inside the outermost elastomeric polymer stage. The core may be a single elastomeric phase, or may consist of multiple phases or layers of polymer. The non-elastomeric and elastomeric polymers in the core may be the same or different from other polymers in the core-shell structure. The core makes up at least 50 percent by weight of the core-shell polymer, preferably at least 70 percent, and mort preferably from 75 to 95 percent by weight.

By "polymers" and "resins", as used herein, is meant homopolymers and copolymers—with copolymers including polymers formed from two or more different monomers, such as terpolymers, etc. The copolymer may be random, block, graft, or tapered, and may have any architecture, such as branched, star, or comb polymers.

By "elastomeric" and "elastomer", as used herein, is meant any polymer or copolymer having a glass transition temperature (Tg) of less than 25° C. Preferably the elastomeric polymer has a Tg of from −120 to 0° C. Most preferably the elastomeric polymer has a Tg of from −90 to −10° C.

By "shell", as used herein, is meant all the layers outside of the outermost elastomeric layer of the core-shell polymer. In cases where the shell consists of multiple layers, the outermost shell is the layer on the outside of the core-shell particle—exposed to the environment.

The core, as defined above, includes all layers of the multistage particle from the outermost elastomeric layer inward. The core may be a single elastomeric stage, a hard layer surrounded by an elastomeric layer, or any number of elastomeric and hard layers wherein the outer layer is an elastomeric polymer. The core could also be made of a matrix of hard and elastomeric materials, having an elastomeric layer as the outermost layer. At least 30 percent of the core is made of elastomeric polymer(s). Preferably at least 40 percent of the core is elastomeric polymer. Most preferably at least 50 percent of the core is elastomeric polymer.

Examples of elastomeric polymers that could be present in the core include, but are not limited to, polybutadiene, butadiene-styrene copolymers, methacrylate-butadiene-styrene terpolymers, polyisoprene, $C_2$-$C_{18}$ acrylic polymers, acrylonitrile copolymers, siloxanes or silicon containing elastomers.

In one embodiment, the elastomer is a styrene/butadiene copolymer. In another embodiment the elastomer is an acrylate/butadiene copolymer. In other embodiments the elastomer is an acrylate polymer or copolymer or a homopolymer of butadiene.

The polymer cores are formed by free-radical emulsion polymerization by means known in the art. Where the core contains more than one layer, the multiplayer core may be synthesized by successive free radical emulsion polymerization, as known in the art.

The shell of the present invention is composed of one or more layers of hard polymers. By hard polymer it is meant a polymer having a Tg of greater than 25° C., preferably in the range of from 40 to 150° C., and most preferably in the range of from 60 to 140° C. The outermost shell layer contains from 0.5 to 30 weight percent, preferably 1 to 20 weight percent, of functional units, either as a blend of functional and non-functional polymers, or as least one copolymer formed from at least one non-functional monomer and at least one functional monomer.

By "functional shell polymer", as used herein, means either a blend of functional and non-functional polymers, or at least one copolymer containing one or more different functional groups, either in the copolymer backbone, as pendant groups, or both. The functionalized copolymer may be formed in several different ways, as known in the art. These include copolymerization (random or block) of one or more functional monomers with non-functional monomers, grafting, and post-polymerization functionalization of a polymer, or a mixture thereof.

Non-functional ethylenically unsaturated monomers useful in forming the shell polymer include, but are not limited to, styrene, (meth)acrylonitrile, ethyl acrylate, propyl acrylate, butyl acrylate, methyl methacrylate, divinyl benzene, acrylonitrile, and mixtures thereof.

Functional monomers useful as comonomers to add functionality to the copolymer include, but are not limited to, those containing acid, anhydride, hydroxy, epoxy, and amine groups. Examples of useful functional comonomers include, but are not limited to: N,N-dimethylaminoethyl(meth)acrylate, N,N-diethylaminoethyl (meth)acrylate, (meth)acrylamide, N,N-dimethylacrylamide, N-methylolacrylamide, N-methylaminopropyl(meth)acrylamide, N,N-dimethylaminopropyl(raeth)acrylamide, N-ethylamino propyl(meth) acrylamide, N,N-diethylaminopropyl (meth)acrylamide, N-methylacrylamide or N-t-butylacrylamide or N-ethyl (meth)acrylamide or chlorides of these compounds, 2-hydroxyethyl(meth)acrylate, hydroxypropyl(meth)acrylate, 4-hydroxybutyl (meth)acrylate, glycidyl(meth)acrylate, ethyl alpha-hydroxymethacrylate, and 2,3-dihydroxypropyl (meth)acrylate, maleic anhydride, maleic acid, substituted maleic anhydride, mono-ester of maleic anhydride, itaconic anhydride, itaconic acid, substituted itaconic anhydride, glutaric anhydride, monoester of itaconic acid, furnaric acid, fumaric anhydride, fumaric acid, substituted fumaric anhydride, monoester of fumaric acid, crotonic acid and its derivatives, acrylic acid, and methacrylic acid; cyanoalkoxyalkyl (meth)acrylates such as omega-cyanoethoxyethyl acrylate, or omega-cyanoethoxyethyl methacrylate; vinyl monomers containing an aromatic ring and an hydroxyl group, such as vinylphenol, para-vinylbenzyl alcohol, meta-vinylphenethyl alcohol, vinyl pyrrolidone, and vinyl imidazole; and other functional monomers, allyl cellosolve, allyl carbinol, methylvinyl carbinol, allyl alcohol, methyllyl alcohol, glycidyl methacrylate, 3,4-epoxybutyl acrylate, acrylonitrile, methacrylonitrile, beta-cyanoethyl methacrylate, beta-cyanoethyl acrylate, Examples of polymerizable surfactants or macromonomers with hydrophilic moieties useful in the present invention include, but are not limited to sodium 1-allyloxy-2-hydroxypropane sulfonate, phosphate methacrylate monomer, poly(ethylene glycol) methylether methacrylate, 1-methacrylamido, 2-imidazolidinone ethane. A preferred functionality for a PC/PET alloy is glycidyl(meth)acrylate.

The shell of the invention makes up less than 50 weight percent of the core-shell polymer, preferably less than 30 weight percent and most preferably from 5 to 25 weight percent of the core-shell polymer.

The core/shell polymer of the invention is synthesized by emulsion free-radical polymerization. A general procedure for producing a single core/single shell polymer particle will be described. One of skill in the art will be able to modify this procedure to form other multi-layer particles useful as impact modifiers. In a first stage, an emulsion is prepared which contains, per part by weight of monomers to be polymerized, 1 to 10 parts of water, 0.001 to 0.03 parts of an emulsifying agent, a major portion of the elastomeric monomer mixture and at least one polyfunctional crosslinking agent. The reaction mixture thus formed is stirred and maintained at a temperature ranging from 45° C. to 65° C. and preferably at a temperature in the region of 60° C. 0.001 to 0.5 parts of a catalyst which generates free radicals is then added and the reaction mixture thus formed is maintained at a temperature of, for example, between ambient temperature and 100° C. and with stirring for a period sufficient to obtain a virtually complete conversion of the monomers. The minor portion of elastomeric monomer(s) and the grafting agent, as well as, at the same time, 0.001 to 0.005 part of a catalyst which generates free radicals, are then added simultaneously to the phase thus obtained.

In a second stage, the core is grafted with a monomer mixture containing at least one functional monomer. To do this, an appropriate amount of the said monomer mixture is added to the reaction mixture resulting from the first stage, in order to obtain a grafted copolymer containing the desired content of grafted chains, as well as, if appropriate, additional amounts of emulsifying agent and of a radical catalyst also within the ranges defined above, and the mixture thus formed is maintained at a temperature within the above-mentioned range, with stirring, until virtually complete conversion of the grafting monomers is obtained. Use may be made, as emulsifying agent, of any one of the known surface-active agents, whether anionic, nonionic or even cationic. In particular, the emulsifying agent may be chosen from anionic emulsifying agents, such as sodium or potassium salts of fatty acids, in particular sodium laurate, sodium stearate, sodium palmitate, sodium oleate, mixed sulphates of sodium or of potassium and of fatty alcohols, in particular sodium lauryl sulphate, sodium or potassium salts of sulphosuccinic esters, sodium or potassium salts of alkylarylsulphonic acids, in particular sodium dodecylbenzenesulphonate, and sodium or potassium salts of fatty monoglyceride monosulphonates, or alternatively from nonionic surfactants, such as the reaction products of ethylene oxide and of alkylphenol or of aliphatic alcohols, alkylphenols. Use may also be made of mixtures of such surface-active agents, if need be.

In one embodiment, the emulsion may be made in a semi-continuous process, preferably at reaction temperatures of from 40-90° C., and preferably from 45° C. to 65° C.

The catalysts capable of being employed, both in the abovementioned first emulsion polymerization stage and in the abovementioned second emulsion polymerization stage, are compounds which give rise to free radicals under the temperature conditions chosen for the polymerization. These compounds can in particular be peroxide compounds, such as hydrogen peroxide; alkali metal persulfates and in particular sodium or potassium persulfate; ammonium persulfate; percarbonates; peracetates, perborates; peroxides such as benzoyl peroxide or lauroyl peroxide; or hydroperoxides such as cumene hydroperoxide, diisopropylbenzene hydroperoxide, para-menthane hydroperoxide or tert-butyl hydroperoxide, However, it is preferable to use catalytic systems of redox type formed by the combination of a peroxide compound, for example as mentioned above, with a reducing agent, in particular such as alkali metal sulfite, alkali metal bisulfite, sodium formaldehyde sulfoxylate ($NaHSO_2HCHO$), ascorbic acid, glucose, and in particular those of the said catalytic systems which are water-soluble, for example potassium persulfate/sodium metabisulfite or alternatively diisopropylbenzene hydroperoxide/sodium formaldehyde sulfoxylate.

It is also possible to add, to the polymerization mixture of one and/or other of the stages, chairs-limiting compounds, and in particular mercaptans such as tert-dodecyl mercaptan, isobutyl mercaptan, n-octyl mercaptan, n-dodecyl mercaptan or isooctyl mercaptopropionate, for the purpose of controlling the molecular mass of the core and/or of the chains grafted onto the nucleus, or alternatively compounds such as phosphates, for the purpose of controlling the ionic strength of the polymerization mixture.

The reaction mixture obtained on conclusion of the second emulsion polymerization stage, which is composed of an aqueous emulsion of the polymer according to the invention, is then treated in order to separate the said polymer therefrom. To do this, it is possible, for example, to subject the emulsion, according to the surfactant used, to a coagulating treatment by bringing into contact with a saline solution ($CaCl_2$ or $AlCl_3$) or a solution acidified with concentrated sulfuric acid and then to separate, by filtration, the solid product resulting from the coagulating, the said solid product then being washed and dried to give a graft copolymer as a powder. It is also possible to recover the polymer contained in the emulsion by using a spray-drying technique, drum drying, freeze-drying or other means known in the art. During the process, additives such as talc may be used to aid in processing the powder. Hard particles may be used in conjunction with the core-shell particles of the invention to further improve anti-blocking and processing properties.

The resulting additive exists in the form of a powder, the particle size of which can range from a few microns, for example 0.05 to 5 microns, to 200 to 450 microns, the said particle size depending on the technique used to separate the graft copolymer from the emulsion polymerization mixture.

A similar procedure is used to produce a multi-layer core-shell polymer, with an additional polymerization stage for each layer.

The functionalized core-shell impact modifier of the invention is especially useful in a polymer matrix that is a blend of a functional polymer or resin, and at least one other non-functional component.

The functional polymer in the matrix is a polymer than can interact with the functional shell on the impact modifier, to form an attraction that helps associate the impact modifier with the functional polymer. Examples of functional polymers useful in the present invention include, but are not limited to polyethylene terephthlate (PET); polybutylene terephthlate (PBT); glycol modified polyethylene terephthlate (PETG); thermosetting polyester; thermoplastic polyesters; thermoplastic co-polyesters; polyetheresteramides; polyamides such as nylon 11, 12, 6, and 6,6; and natural polymers such as carbohydrates, cellulose, and biopolymers such as polylactic acid and polyhydroxy butyrate.

The non-functional components could be polymeric, non-polymeric, or a mixture thereof. Engineering resins useful as non-functional resins include, but are not limited to, alkyl (meth)acrylate polymers and copolymers, acrylonitrile/butadiene/styrene terpolymers (ABS), acrylonitrile/styrene/acrylate copolymers, polycarbonates, methacrylate/butadiene/styrene copolymers, polystyrene, acrylonitrile/acrylate copolymers, acrylonitrile/methyl methacrylate copolymers, polyolefins, poly(vinyl chloride), a homopolymer of a vinylidene halide, and alloys thereof.

The non-functional components could also be non-polymeric, including fillers such as pigments and glass beads.

The blend of nonfunctional to functional polymers is such that the nonfunctional polymer is present at from 20-80 wt percent, preferably from 40-75 weight percent and more preferably at from 50-75 weight percent, while said functional polymer is present at from 20-80 weight percent, preferably from 25 to 60 weight percent and more preferably at from 50 to 75 weight percent, based on the weight of the functional and non-functional polymers (not including the MBS impact modifier or other additives).

The functional core-shell impact modifier of the invention is blended into the polymeric composition at a level of from 0.5 to 70 percent by weight, and preferably 2 to 55 percent by weight, based on the weight of the polymers. The impact modified may be blended into the plastic by standard means such as melt extrusion, compaction, roll mill, and other such means as known in the art.

In addition to the polymers and the impact modifier, one or more other additives may also be added at usual levels. Typical additives include, but are not limited to, processing aids, anti-oxidants, stabilizers, pigments, dyes, plasticizers, anti-oxidants, or lubricants.

The impact modified thermoplastic composition according to the invention can be prepared by any method which makes it possible to produce a homogeneous mixture containing a thermoplastic polymer, the impact additive according to the invention and optionally other additives. It is possible, for example, to dry-mix the ingredients constituting the resin composition, then to extrude the resulting mixture and to reduce the extrudate to pellets. When the thermoplastic polymer is obtained by emulsion polymerization, it may be convenient to mix the emulsion containing the core-shell additive according to the invention with the emulsion of the thermoplastic polymer and to treat the resulting emulsion in order to separate therefrom the solid product which it contains, as described above with respect to the separation of the core-shell polymer.

In one embodiment of the invention, the functionalized core-shell polymer is used in an engineering resin/PET blend. In a preferred embodiment the functionalized core-shell modifier is used in a PC/PET blend, providing an impact modification at −30° F. of at least 28 kJ/m$^2$.

Some specific examples of the compositions of the invention are listed below. Those in the art would e able to recognize other examples of the invention, based on the specification and examples listed:

The functional core shell polymer and a blend of polycarbonate (20 to 80 wt %) and PET (20-80 wt % based on weight of total polymer solids).

The functional core shell polymer and a glass fiber reinforced polyamide.

The functional core shell polymer and a blend of a natural or biopolymer and a methyl(meth)acrylate homopolymer or copolymer.

The following examples are intended to illustrate further various aspects of the present invention, but are not intended to limit the scope of the invention in any aspect.

EXAMPLES

Example 1

Functionalized Core-shell Impact Modifier

Core:

To a 1-gallon high-pressure reactor was charged: de-ionized water, emulsifier, 1,3-butadiene, t-dodecyl mercaptan, and p-menthane hydroperoxide as an initial kettle charge, as outlined below. The solution was heated, with agitation, to 43° C. at which time a redox-based catalyst solution was charged, effectively initiating the polymerization. Then the solution was further heated to 56° C. and held at this temperature for a period of three hours.

Three hours after polymerization initiation, a second monomer charge, one-half of an additional emulsifier and reductant charge, and additional initiator were continuously added over eight hours. Follow the completion of the second monomer addition, the remaining emulsifier and reductant charge plus initiator was continuously added over an additional five hours.

Thirteen hours after polymerization initiation, the solution was heated to 68° C. and allowed to react until at least twenty hours had elapsed since polymerization initiation, producing butadiene rubber latex, $R_1$.

The resultant butadiene rubber latex ($R_1$) contained 38% solids and had a particle size, $d_w$, of ≈160 nm and a $d_w/d_n$ of 1.1.

| Butadiene Rubber Latex, $R_1$ | |
|---|---|
| Kettle Charge | |
| de-ionized water | 116.5 parts |
| beef tallow fatty acid, potassium salt | 0.1 parts |
| 1,3-butadiene | 21.9 parts |
| t-dodecyl mercaptan | 0.1 parts |

| Butadiene Rubber Latex, $R_1$ | |
|---|---|
| Initiator | |
| p-menthane hydroperoxide | 0.1 parts |
| Redox-based Catalyst | |
| de-ionized water | 4.5 parts |
| sodium tetrapyrophosphate | 0.3 parts |
| ferrous sulfate | 0.004 parts |
| dextrose | 0.3 parts |
| Second Monomer | |
| 1,3-butadiene | 77.8 parts |
| t-dodecyl mercaptan | 0.2 parts |
| Emulsifier & Reductant | |
| de-ionized water | 30.4 parts |
| beef tallow fatty acid, potassium salt | 2.8 parts |
| dextrose | 0.5 parts |
| Initiator | |
| p-menthane hydroperoxide | 0.8 parts |

Graft Polymerization:

A 5-liter reactor was charged with de-ionized water and polybutadiene rubber latex. The reactor was assembled inside the hood on a heating mantle and was purged with nitrogen for 20 minutes while heating it to 77° C. at 180 rpm.

At 55° C., a pre-mixed solution of hydroxymethane sulfinic acid, sodium salt (CRO) in de-ionized water was added via syringe.

A premixed solution of a mixture of monomers methyl methacrylate (85 -99.0 weight percent), ethyl acrylate (0-5 weight percent), glycidyl methacrylate (0.5 to 10 wt percent), along with divinyl benzene (chain transfer agent) (0.5-6 wt. percent) (the total equaling 100 weight percent), and t-butyl hydroperoxide (initiator) was added to the reactor for over 70 minutes in a semi-continuous feeding.

After the end of addition of shell monomers, the reaction was kept on hold for 80 minutes.

At 30 minutes hold, an aliquot of initiator, hydroxymethane sulfinic acid, sodium salt (CRO), and t-butyl hydroperoxide (CHT) in de-ionized water, was added to facilitate the conversion of un-reacted monomers, if any.

After 80 minutes of holding period is complete, anti-oxidant package was added to the reactor and the reaction was allowed to cool to room temperature. [Anti-oxidant emulsion was made by heating a mixture of Triethyleneglycol-bis(3-(3-tert -butyl-4-hydroxy-5-methylphenyl)-propionate), Dilauryl Thiodipropionate, and Oleic acid followed by addition of a solution of potassium hydroxide in de-ionized water]

The grafted latex was then filtered through a cheese-cloth into a 1-gallon bottle.

Coagulation

A 5-liter reactor was charged with de-ionized water and concentrated sulfuric acid. The reactor was assembled in the hood on a heating mantle and the temperature was raised to 51.7° C. at 180 rpm. At 51.7° C., the grafted latex (above) was added slowly while increasing the agitation to 400 rpm. The latex instantly coagulated. After the completion of addition of grafted latex, the reaction mixture was rinsed with de-ionized water. Then, flow aid latex (P550) was added to the reactor slowly.

The coagulation reaction was kept on hold at 51.7° C. for 20 minutes constantly stirring at about 400 rpm. After 20 minutes, reactor was heated to 85° C. During this heating a sample was pulled out from the reactor via syringe and its pH was measured.

The pH was adjusted to 3.5 by adding a 20% solution by weight of potassium.

Once, the pH is reached, hold the reaction at 85° C. for 20 minutes. After 20 minutes holding in complete, the reaction temperature was raised to 96.1° C. and kept on hold at this temperature for 20 more minutes. The hot coagulated polymer was vacuum filtered and washed with hot water (>50° C.). The white polymer powder was dried in vacuum for 2 hours and dried in oven at 120° C. overnight.

Example 2

A comparison of the effect of the functional impact modifiers of the invention on PC/PBT and PC/PET alloys was conducted. In each experiment the PC alloy contained 50 weight percent of PC, and 50 weight percent of PBT or PET. The MBS is a 78% butadiene core/12% shell, with the shell containing 10 weight percent glycidyl methacrylate and 90 weight percent MMA. The low temperature impact was measured by ASTM D256. The results are found in TABLE 1.

TABLE 1

|  | −20° C. | −30° C. |
|---|---|---|
| PC/PBT | 6.3 kJ/m$^2$ | 4.8 kJ/m$^2$ |
| 12% MBS | 26.3 kJ/m$^2$ | 25.2 kJ/m$^2$ |
| PC/PET | 6.0 kJ/m$^2$ | 6.1 kJ/m$^2$ |
| 12% MBS | 46.1 kJ/m$^2$ | 40.4 kJ/m$^2$ |

The results show that the improvement in low temperature impact strength for the PC/PET alloy is much higher than that for the PC/PBT alloy. While not being bound by any particular theory, it is believed that the difference is likely associated with the variations in crystallization rates between the two resins.

What is claimed is:

1. An impact modified polymer alloy composition consisting of:
   a) one or more functional polymers selected from the group consisting of polyethylene terephthlate (PET), polyamides, glycol modified polyethylene terephthlate (PETG), natural polymers, carbohydrates, cellulose, biopolymers, polylactic acid, and polyhydroxy butyrate;
   b) one or more non-functional polymers selected from the group consisting of alkyl (meth)acrylate polymers and copolymers, acrylonitrile/butadiene/styrene terpolymers (ABS), acrylonitrile/styrene/acrylate copolymers, polycarbonates, methacrylate/butadiene/styrene copolymers, polystyrene, acrylonitrile/acryilate copolymers, acrylonitrile/methyl methacrylate copolymers, poly(vinyl chloride), a homopolymer of a vinylidene halide, and alloys thereof;
   wherein the ratio of functional polymer to non-functional polymer is from 20:80 to 80:20,
   c) functional core-shell impact modifier, wherein the outermost shell comprises from 0.5 to 30 weight percent, based on the shell polymer, of functional groups including at least glycidyl(meth)acrylate, and the core comprises one or more polymers selected from the group consisting of acrylic, acrylate/butadiene, siloxanes and silicon,
   and optionally
   d) non-functional additives selected from the group consisting of anti-oxidants, lubricants, glass beads, polymer beads, glass fibers, carbon nanotubes, dyes, and pigments.

2. The impact modified composition of claim 1, wherein said core-shell polymer has an all acrylic polymer core.

3. The impact modified composition of claim 1, wherein said core-shell polymer has an acrylate/butadiene copolymer core.

4. The impact modified composition of claim 1, wherein said core-shell polymer has a siloxanes polymer core.

5. The impact modified composition of claim 1, wherein said core-shell polymer has a silicon polymer core.

6. The impact modified composition of claim 1, wherein said core-shell polymer has an outermost shell further comprising methyl(meth)acrylate.

7. The impact modified composition of claim 1, wherein said functional polymer is polyethylene terephth late, polyamides, or glycol modified polyethylene terephthlate (PETG).

8. The impact modified composition of claim 1, wherein said non-functional polymer comprises polycarbonate, or polymethyl(meth)acrylate homopolymers and copolymers.

9. The impact modified composition of claim 1, wherein said functional core-shell impact modifier comprises from 0.5 to 70 wt % of the polymer alloy composition.

10. The impact modified composition of claim 1, wherein said functional core-shell impact modifier comprises from 2 to 55 wt % of the polymer alloy composition.

11. The impact modified composition of claim 1, wherein the outer shell of said functional core-shell impact comprises from 1-20 weight percent of functional groups.

12. The impact modified composition of claim 1, wherein the ratio of functional polymer to non-functional polymer is from 40:60 to 75:25.

13. The impact modified composition of claim 1, wherein the functional polymer is PET, the non-functional polymer is polycarbonate.

14. The impact modified composition of claim 1 which is a powder or a pellet.

* * * * *